United States Patent
McDonough (10) Patent No.: US 7,031,374 B1
(45) Date of Patent: Apr. 18, 2006

(54) SYSTEM AND METHOD FOR SELECTING SAMPLE STREAMS IN DIRECT SEQUENCE SPREAD SPECTRUM COMMUNICATIONS

(75) Inventor: John G. McDonough, La Jolla, CA (US)

(73) Assignee: Texas Instruments Incorporated, Dallas, TX (US)

( * ) Notice: Subject to any disclaimer, the term of this patent is extended or adjusted under 35 U.S.C. 154(b) by 724 days.

(21) Appl. No.: 09/684,886

(22) Filed: Oct. 6, 2000

(51) Int. Cl.
*H04B 1/707* (2006.01)
*H04B 7/216* (2006.01)

(52) U.S. Cl. ............... 375/148; 375/144; 375/340; 375/349; 342/361; 370/342

(58) Field of Classification Search ........ 375/147–153, 375/144, 130, 340, 148, 267, 335, 347, 349; 370/303, 335, 479, 482; 455/3.04, 562.1
See application file for complete search history.

(56) References Cited

U.S. PATENT DOCUMENTS

| | | | |
|---|---|---|---|
| 4,901,307 A | 2/1990 | Gilhousen et al. | 370/18 |
| 5,056,109 A | 10/1991 | Gilhousen et al. | 375/1 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,228,054 A | 7/1993 | Rueth et al. | 375/1 |
| 5,237,586 A | 8/1993 | Bottomley | 375/1 |
| 5,267,261 A | 11/1993 | Blakeney, II et al. | 375/1 |
| 5,267,262 A | 11/1993 | Wheatley, III | 375/1 |
| 5,305,349 A | 4/1994 | Dent | 375/1 |
| 5,309,474 A | 5/1994 | Gilhousen et al. | 375/1 |
| 5,383,219 A | 1/1995 | Wheatley, III et al. | 375/1 |
| 5,414,728 A | 5/1995 | Zehavi | 375/200 |
| 5,903,550 A * | 5/1999 | Spock | 370/335 |
| 5,987,076 A | 11/1999 | Zehavi et al. | 375/340 |
| 6,097,712 A * | 8/2000 | Secord et al. | 370/335 |
| 6,473,447 B1 * | 10/2002 | Strich et al. | 375/130 |
| 6,507,604 B1 * | 1/2003 | Kuo | 375/148 |
| 6,563,859 B1 * | 5/2003 | Oishi et al. | 375/148 |
| 6,728,323 B1 * | 4/2004 | Chen et al. | 375/340 |

FOREIGN PATENT DOCUMENTS

JP   0 794 623 A2   10/1997

OTHER PUBLICATIONS

Cass Lewart, "Modem Handbook for the Communications Professional".*

* cited by examiner

*Primary Examiner*—Khai Tran
*Assistant Examiner*—Edith Chang
(74) *Attorney, Agent, or Firm*—Ronald O. Neerings; Wade James Brady, III; Frederick J. Telecky, Jr.

(57) ABSTRACT

A RAKE receiver with demodulating fingers is presented having the capability to assign a specific sample stream, from among a plurality of received sample streams, to any of the demodulating fingers. The demodulating finger includes a MUX to receive the plurality of sample streams. Commands from a controller to the MUX of a demodulating finger select a specific sample stream to be demodulated by that demodulating finger. Since each demodulating finger receives all the sample streams, and any sample stream can be selected, the receiver has the flexibility of optimally varying the assignment of demodulating fingers to sample streams. A method for selecting a sample stream for demodulation, from among a plurality of sample streams, is also provided.

14 Claims, 5 Drawing Sheets

SYSTEM AND METHOD FOR SELECTING SAMPLE STREAMS IN DIRECT SEQUENCE SPREAD SPECTRUM COMMUNICATIONS

BACKGROUND OF THE INVENTION

The present invention relates generally to the field of direct sequence spread spectrum (DSSS) communications and, more particularly, to the selection of sample streams for despreading and demodulation in a code division multiple access (CDMA) RAKE receiver.

DESCRIPTION OF RELATED ART

In spread spectrum communications, such as in CDMA systems, pseudorandom noise (PN) sequences are used to generate spread spectrum signals by increasing the bandwidth (i.e., spreading) of a baseband signal. A forward link waveform transmitted by the base station may be comprised of a pilot waveform and a data waveform. Both of the waveforms are received with the same relative phase and amplitude distortions introduced by the channel. The pilot waveform is an unmodulated PN sequence which aids in the demodulation process, as is well-known in the art as "pilot-aided demodulation." Conventional pilot-aided demodulation methods typically include the steps of (i) demodulating the pilot waveform, (ii) estimating the relative phase and amplitude of the pilot waveform, (iii) correcting the phase of the data waveform using the estimated phase of the pilot waveform, and (iv) adjusting the weight of data symbols used in maximal ratio combining in a RAKE receiver based on the estimated amplitude of the pilot waveform. Steps (iii) and (iv) above are performed as a "dot product" as is known in the art. Conventionally, steps (i) through (iv) are performed in hardware. In some conventional methods, a controller having a central processing unit (CPU) and/or a digital signal processor (DSP) may perform some of the above-described steps.

Figure 1:
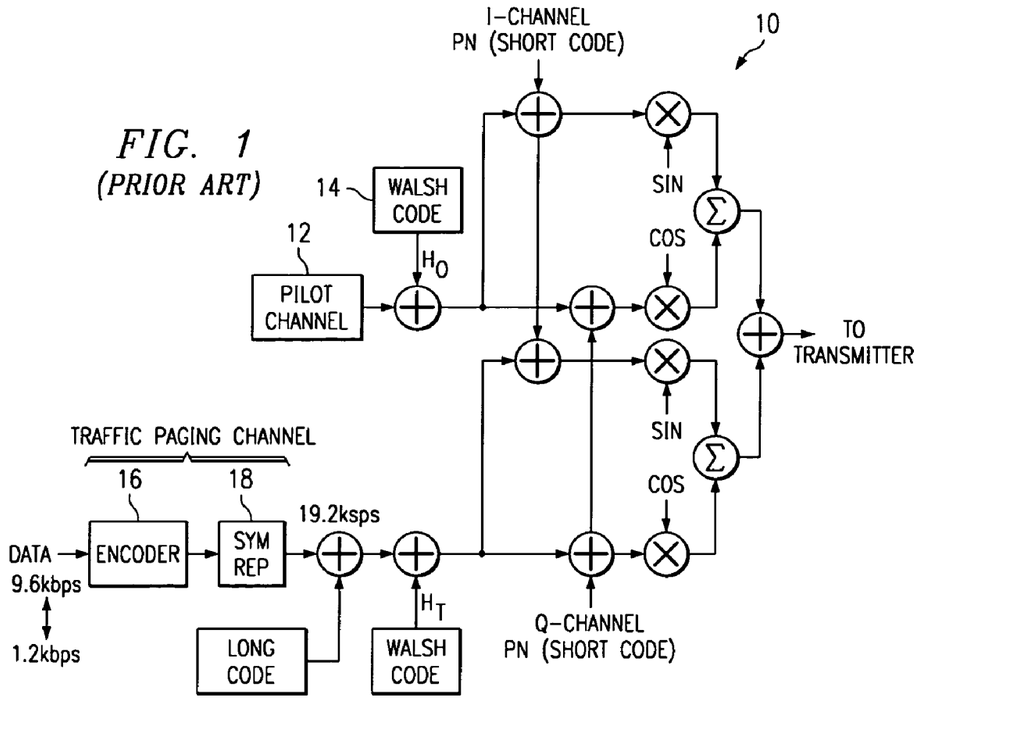
FIG. 1 illustrates a conventional IS-95A or TIA/EIA-95-B forward link base station transmitter (prior art).

FIG. 1 illustrates a conventional IS-95A or TIA/EIA-95-B forward link base station transmitter 10 (prior art). A pilot channel 12 is generated that has no data. That is, the data is predetermined to be all "0" bits. The pilot channel is modulated, or covered with a Walsh code from Walsh code generator 14 at 1.2288 Mcps (megachips per second). 64 orthogonal Walsh codes, each of 64 bits, are used in the IS-95A and TIA/EIA-95-B systems. Walsh code $H_0$ is used to modulate the pilot channel.

Also depicted is a traffic or paging channel, which shall be referred to herein as an information channel. Data is input at one of a plurality of data rates from 9.6 kbps (kilobits per second) to 1.2 kbps. The data is encoded at encoder 16, at one bit per two code symbols, so that the output of the encoder 16 varies from 19.2 ksps (kilosymbols per second) to 2.4 ksps. Symbol repetition device 18 repeats the code symbols from 1 to 8 times to create a 19.2 ksps signal. Alternately stated, either 1, 2, 4, or 8 modulation symbols are created per code symbol. Then, the information channel is scrambled with a long code at the same 19.2 ksps rate. Other rates are described in the IS-2000 standard. The information channel is covered with a different Wash code from that used to cover the pilot channel, code $H_T$ for example.

After being modulated with Walsh codes, each channel is spread with a common short code, or PN sequence. Each channel is split into I and Q channels, and spread with I and Q channel PN sequences. A 90 degree phase shift is introduced by multiplying the I channels with a sin function, while the Q channels are being multiplied with a corresponding cosine function. Then, the I and Q channels are summed into a QPSK channel. In the IS-95A and TIA/EIA-95-B standards, the same baseband symbols are assigned to both the I and Q channels. The combination of all the QPSK channels, including pilot, synchronization, paging, and traffic channels can be considered a composite waveform. This composite waveform is then up-converted in frequency (not shown) and transmitted.

Figure 2:
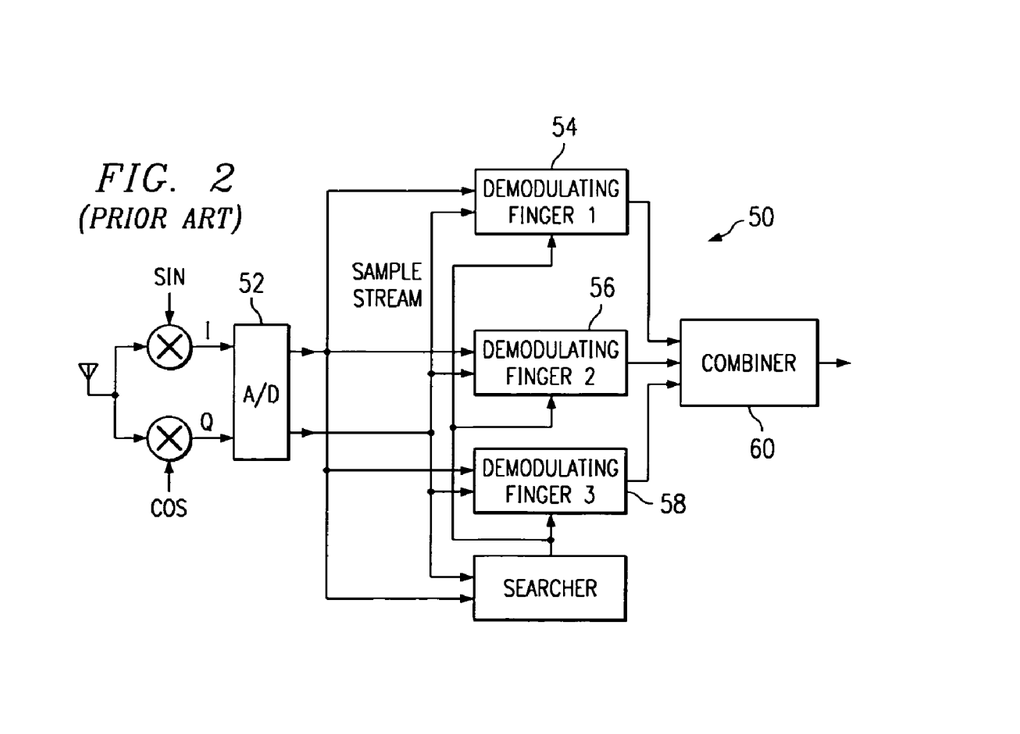
FIG. 2 is a conventional IS-95A or TIA/EIA-95-B CDMA receiver (prior art).

FIG. 2 is a conventional IS-95A or TIA/EIA-95-B CDMA receiver (prior art). At the mobile station receiver 50 the transmitted signals are accepted as analog information, and converted into a digital I and Q sample stream at A/D 52. Conventionally, a multi-finger RAKE is used to variably delay and amplify multipath delays in the sample stream, so that degradation due to fading can be minimized. Three demodulating fingers, demodulating finger 1 (54), demodulating finger 2 (56), and demodulating finger 3 (58) all receive the same I and Q sample stream, which has been represented as a single line for simplicity. Each demodulating finger is assigned one of the sample stream multipath delays. PN codes and Walsh codes are generated with delays consistent with the multipath delays of the sample stream to be demodulated. The sample stream from the multipaths is coherently combined in combiner 60 based on a maximal ratio combining (MRC) principle.

The IS-2000 standards propose, and future uses will include multiple information channels with a variety of symbol rates. A variety of symbol accumulation periods will be required in the process of demodulating these information channels. In IS-95A and TIA/EIA-95-B standard communications, a symbol is conventionally spread with 64 PN chips at the transmitter. At the receiver, the symbol is recovered by despreading, uncovering, and accumulating the symbol over a period of 64 PN chips. The accumulated symbol is called a soft symbol. Conventionally, the soft symbol is corrected with respect to phase and weighted with respect to amplitude after accumulation, using the pilot waveform as a phase and amplitude reference.

The receiver 50 may also receive a sample stream including signals from more than one base station. The base stations are precisely timed and synchronized using offsets of the PN spreading code. That is, the sample stream received from two different base stations has delays that are typically much larger than multipath delays. The receiver 50 has diversity characteristics which permit it to demodulate the sample stream from multiple base stations, for the purposes of a handoff for example.

In some conventional CDMA RAKE receivers, the outputs of multiple demodulating fingers are "hardwired" to combine the common information channels in a sample stream. The decision and data transfer operations of the individual finger channels are predetermined. Hardwiring reduces flexibility, as the finger channels of the demodulating fingers must always be combined with the same partner finger channels. Thus, the number of information channels, the information channel order, and the information channels that can be combined across demodulating fingers are necessarily constricted when the finger channel outputs are connected in a hardwired arrangement. Hardwiring does not permit partner finger channels to be used with different combiner channels. A conventional receiver with a fixed number of finger channels in each demodulating finger can only demodulate such a fixed number of IS-2000 standard information channels.

Alternately, the soft symbols output by the demodulating finger can be buffered and transferred, via a data bus, to a CPU or DSP for combining. This software combining approach provides flexibility, as potentially the finger channels can be combined in any variation. However, the CPU or DSP may not have enough bandwidth to accomodate the speed of the hardware combining solutions, nor will such solutions prove power efficient.

It would be advantageous if a CDMA receiver could be designed to maximize flexibility, permitting demodulating fingers to be used to demodulate any sample stream, and the finger channels of the demodulating finger to be used to demodulate any information channel in a sample stream.

It would be advantageous if a CDMA receiver could be designed to minimize the number of demodulating fingers required to demodulate information channels in many different sample streams. To that end, it would be desirable if any demodulating finger could be selected to demodulate information channels in any of the sample streams.

It would be advantageous if a CDMA receiver could be used to demodulate a plurality of sample streams, from a plurality of carrier signals. To that end, it would be useful if the demodulating fingers were able to independently demodulate sample streams received on different antennae.

SUMMARY OF THE INVENTION

Accordingly, a DSSS communications receiver and demodulating finger is provided, capable of demodulating information channels in a plurality of sample streams. The system includes a plurality of demodulating fingers, with each demodulating finger accepting the plurality of sample streams. Each demodulating finger is connected to a controller to accept sample stream selection commands. Each demodulating finger demodulates information channels in the selected sample stream, providing soft symbols to a combiner.

Preferably, each demodulating finger includes a multiplexer (MUX) to accept the plurality of sample streams. Sample stream selection commands to the MUX control the MUX input selection. Each MUX has an output to provide the selected sample stream. Each demodulating finger also includes a plurality of finger channels, with each finger channel being coupled to the MUX to accept the selected sample stream, after a despreading operation. Each finger channel also accepts an uncovering code to uncover an information channel in the selected sample stream, providing soft symbols from the uncovered information channel. Preferably, the uncovering code is generated external to the demodulating finger, and provided so that each finger channel receives an uncovering code corresponding to the information channel to be demodulated.

As mentioned above, IS-2000 standard transmissions involve the use of three independent carrier frequencies, which are converted into three corresponding sample streams. The controller determines which sample stream is to be demodulated by each demodulating finger, and sends sample stream selections accordingly. The demodulating finger has the flexibility to demodulate any of the sample streams. That is, any sample stream may be selected for demodulation. For example, in one aspect of the invention the controller may select a different demodulating fingers for each of the three sample streams. In another aspects, the same sample stream can be simultaneously demodulated by two, three, or more demodulating fingers. This latter feature permits a receiver to demodulate a sample stream with more information channels than there are finger channels, so that information channels in the sample stream are demodulated between the combination of two or more demodulating fingers. Further, the independent selection feature permits the demodulating fingers to be used for soft handoffs and multipath demodulation. More importantly, the independent selection feature permits arbitrary demodulating finger and finger channel assignments for each sample stream.

A method is also provided for demodulating information channels in a plurality of sample streams, derived from corresponding carrier frequencies. The method comprises accepting a plurality of sample streams; selecting a sample stream from among the plurality of sample streams; and, providing soft symbols from the selected sample steam. Each sample stream includes a plurality of information channels, so that providing soft symbols includes providing soft symbols from a plurality of demodulated information channels in the selected sample stream.

DETAILED DESCRIPTION OF THE PREFERRED EMBODIMENTS

Figure 3:
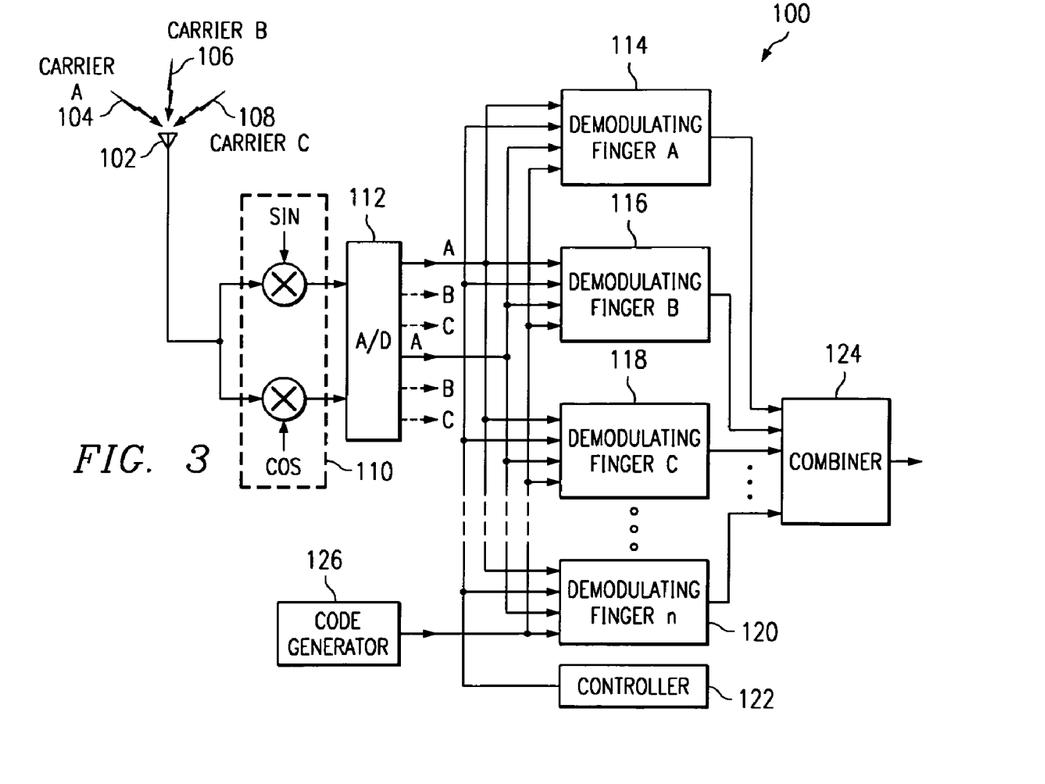
FIG. 3 is a schematic block diagram illustrating the present invention receiver.

FIG. 3 is a schematic block diagram illustrating the present invention receiver 100. Receiver 100 has an antenna 102 to accept a plurality of carrier signals, including carrier signals A, B, and C, represented by reference designators 104, 106, and 108, respectively, where each carrier signal has a different frequency. For simplicity, these carrier signals will be referred to herein as carriers.

The carriers 104–108 are input into a 90 degree phase shift block 110, where the in-phase and quadrature-phase portions of the carrier signal are separated into I and Q channels. Carriers A, B, and C are output from the 90 degree phase shift block 110 and provided to the A/D converter 112, where they are converted into respective sample streams A, B, and C. The sample streams are provided to each of the demodulating fingers, including demodulating finger A (114), demodulating finger B (116), demodulating finger C (118), and demodulating finger n (120), where n can be any whole number. In a preferred aspect of the invention, n=6. As shown, the data lines connecting the A/D converter 112 and the demodulating fingers 114–120 actually represent a plurality of sample streams, each having I and Q channels.

FIG. 3 depicts three carriers (A, B, and C) and corresponding sample streams A, B, and C. However, the present invention is not limited to any particular number of carriers or sample streams.

Figure 4:
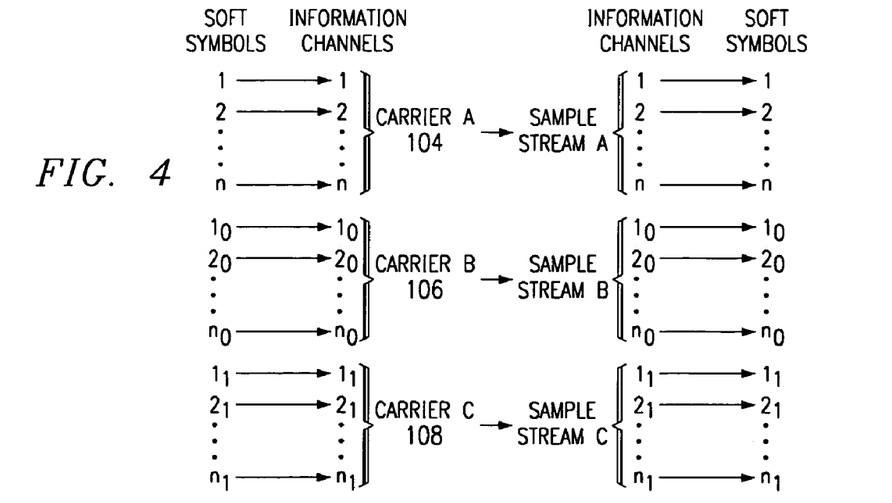
FIG. 4 is a depiction of information channels transformed to corresponding carrier frequencies, sample streams, and soft symbols.

FIG. 4 is a depiction of information channels transformed to corresponding carrier frequencies, sample streams, and soft symbols. Carrier A (104) (see FIG. 3) includes a plurality of modulated information channels, as depicted in the modulation process described above in the explanation of FIG. 1. Information channels 1, 2, up to n, are shown, where n can be any whole number. Typically, the information channels are traffic (voice and data) or paging channels, but they can also be synchronization or control channels. Carrier A is converted to sample stream A at the output of A/D converter 112 (see FIG. 3). Likewise, each carrier, or sample stream includes a plurality of information channels. Carrier B (sample stream B) includes information channels $1_0$, $2_0$, up to $n_0$, and carrier C (sample stream C) includes information channels $1_1$, $2_1$, up to $n_1$. As explained in more detail below, the demodulating fingers perform operations to despread and uncover the information channels to recover the soft symbols as is well known in the art. It should be understood that the operation of demodulation, as used herein, includes the operations of despreading, uncovering, accumulating, and pilot symbol dot product operations. It should also be understood that the various carriers and sample streams may include common information channels. That is, information channel 1 in sample stream A may be the same as information channels $1_0$ in sample stream B and information channels $1_1$ in sample stream C. However, in some aspects of the invention, information channels from each sample stream may be combined into a common stream of soft symbols. Returning briefly to FIG. 1, the soft symbols at the output of the demodulating fingers are related to the coded data bits at the output of encoder 16. Although only three carriers (sample streams) are shown, the present invention is not limited to any particular number of carriers (sample streams).

Figure 5:
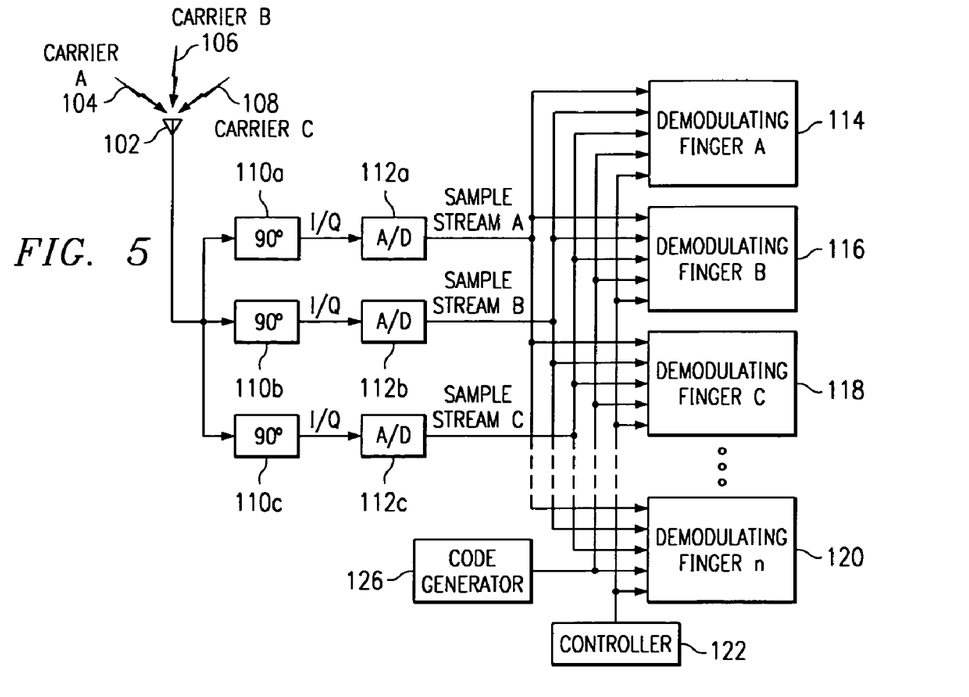
FIG. 5 is schematic block diagram detailing aspects of the receiver of FIG. 3.

FIG. 5 is a schematic block diagram detailing aspects of the receiver 100 of FIG. 3. Sample streams A, B, and C are depicted, with the I and Q channels being shown as a common data line for simplicity. Each of the carriers has an independent output from a separate 90 degree phase shift block, where carrier A is output from 90 degree block 110a, carrier B is output from 90 degree block 110b, and carrier C is output from 90 degree block 110c. Likewise, each of the sample streams has an independent output from a separate A/D converter, where sample stream A is output from A/D 112a, sample stream B is output from A/D 112b, and sample stream C is output from A/D 112c. Each of the demodulating fingers 114–120 has a sample stream input to receive the plurality of sample streams. As shown, sample streams A, B, and C are received by the demodulating fingers 114–120.

A controller 122 is shown having an output connected to a sample stream selection input of each of the demodulating fingers 114–120. The controller 122 supplies commands to each demodulating finger that select the sample stream to be demodulated. That is, each demodulating finger selects a sample stream from the plurality of sample streams in response to sample stream selection commands from the controller 122. In response to the sample stream selection commands, each demodulating finger provides soft symbols from the selected sample stream to a combiner (not shown).

To demodulate the selected sample stream, each demodulating finger must essentially reverse the spreading and covering process described in the explanation of FIG. 1. Therefore, a PN sequence, one for each of the I and Q channels of the selected sample stream, is required. A distinct Walsh code is also required to uncover each of the information channels in the selected sample stream. It should be understood that a Walsh code, as used herein, is equivalent to an uncovering code. In some aspects of the invention, each demodulating finger generates the PN and Walsh codes needed for its despreading and uncovering operations. Alternately, some or all of these operations can be performed outside the demodulating finger. In the preferred aspect of the invention, a code generator block 126 supplies the PN and Walsh codes to each of the demodulating fingers 114–120.

Figure 6:
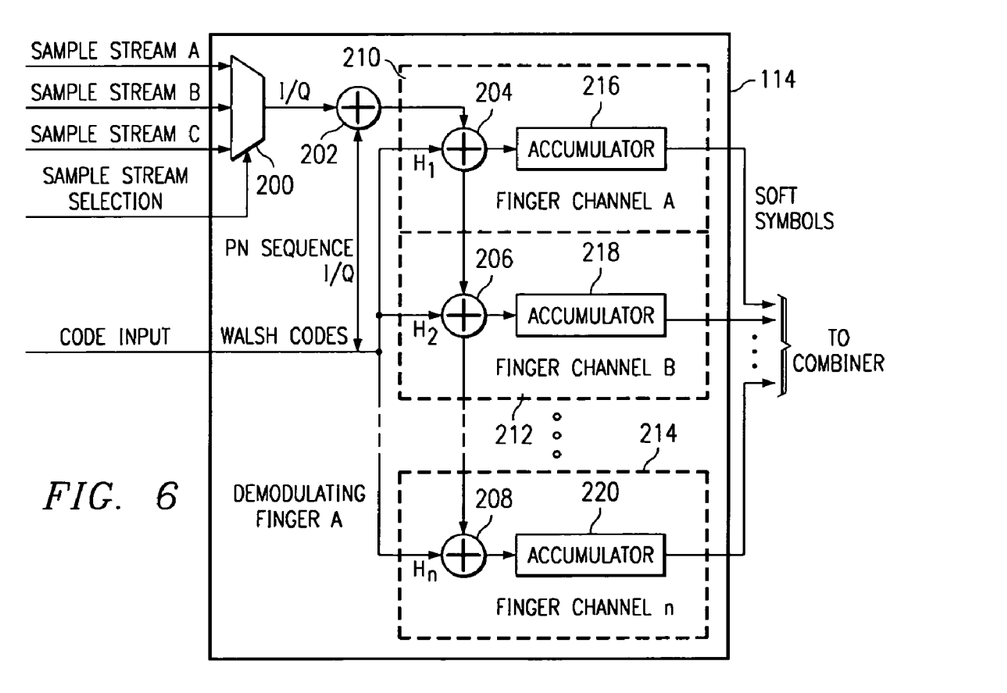
FIG. 6 is a schematic block diagram illustrating the demodulating finger of the present invention.

FIG. 6 is a schematic block diagram illustrating the demodulating finger of the present invention. Specifically, demodulating finger A (114) is depicted, however, demodulating finger 114 is representative of the other demodulating fingers 114–120. The three sample streams are received at the sample stream input. A sample stream selection input receives sample stream selection commands, and a code input receives the PN and Walsh codes required for the despreading and uncovering operations.

A MUX 200 has a plurality of sample stream inputs connected to the demodulating finger sample stream input. As shown, MUX 200 has three sample stream inputs corresponding to the three sample streams. MUX 200 also has a sample stream selection input connected to the demodulating finger sample stream selection input to accept commands from the controller 122 (not shown). Once again it should be noted that the MUX 200 is not limited to any particular number of inputs or sample streams. The MUX 200 selects a sample stream in response to the selection commands and provides the selected sample stream at an output. For simplicity, the I and Q channels of the sample streams are represented with a single data line.

The output of MUX 200 is connected to a despreading unit 202 which has an input to accept the I and Q channels of the selected sample stream. Despreading unit 202 also has a input, connected to the demodulating finger code input, to accept the PN sequence used to despread the selected sample stream. As explained above, separate I and Q PN sequences are required. The despread sample stream output from despreading unit 202 is supplied to the sample stream input of a plurality of finger channels. Specifically, the sample streams are supplied to a plurality of uncovering units 204–208 associated with finger channels 210–214, respectively. Finger channels 210–214, with uncovering units 204–208, are depicted, but the invention is not limited to any particular number of finger channels. Each of the uncovering units 204–208 accepts a Walsh code from the demodulating finger code input, and ultimately, from the code generator 126 (see FIG. 5).

For example, sample stream A is selected for demodulation by demodulating finger A (114). Referring briefly to FIG. 4, it can be seen that sample stream A includes at least three information channels (1, 2, and n). Each of the these information channels are covered in the transmitter with a Walsh code. For example, Walsh code H1 is used to cover information channel 1, Walsh code H2 is used to cover information channel 2, and Walsh code Hn is used to cover information channel n. Returning to FIG. 6, Walsh code H1 is supplied to uncovering unit 204 to uncover information channel 1, Walsh code H2 is supplied to uncovering unit 206 to uncover information channel 2, and Walsh code Hn is supplied to uncovering unit 208 to uncover information channel n.

The outputs of the uncovering units 204–208 are provided to respective accumulators 216–220 where the soft symbols are accumulated. The soft symbols are output by each finger channel 210–214, which are connected to the demodulating finger soft symbol output and, ultimately, to combiner 124 (see FIG. 3).

Figure 7:
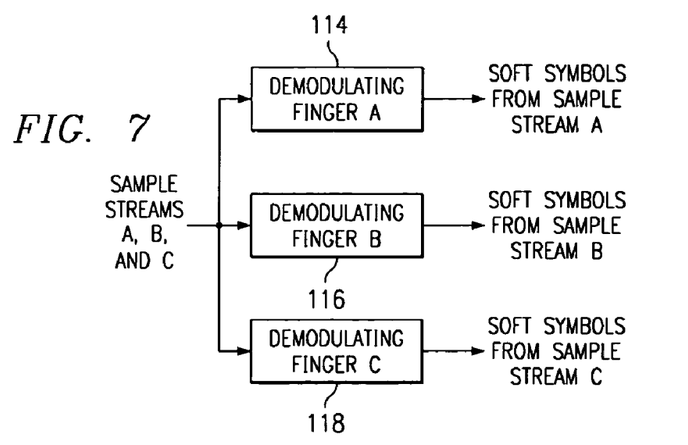
FIG. 7 illustrates an example where three demodulating fingers each demodulate a different sample stream.

FIG. 7 illustrates an example where three demodulating fingers 114–118 each demodulate a different sample stream. The controller 122 (not shown) sends commands for demodulating finger A (114) to demodulate sample stream A. As a result, demodulating finger A (114) provides soft symbols from sample stream A at its soft symbol output. Likewise, the controller 122 (not shown) sends commands for demodulating finger B (116) to demodulate sample stream B and demodulating finger C (118) to demodulate sample stream C. As a result, demodulating finger 116 provides soft symbols from sample stream B and demodulating finger 118 provides soft symbols from sample stream C at their respective soft symbol outputs. It is to be understood that there are no predefined relationships between the demodulating fingers and the sample streams. In the above example, demodulating finger A (114) could have been selected to demodulate either sample stream B or C as an alternative to demodulating sample stream A. Further, more than three demodulating fingers can be used to demodulate a plurality of sample streams, where each of the demodulating fingers operates on a selected sample stream from the plurality of sample streams.

Figure 8:
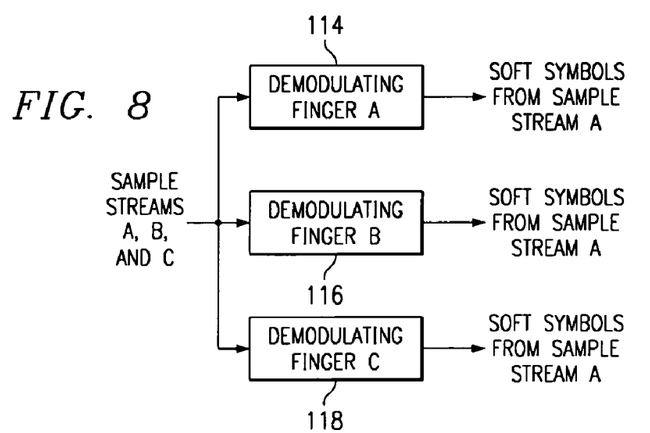
FIG. 8 illustrates an example where three demodulating fingers each demodulate the same sample stream.

FIG. 8 illustrates an example where three demodulating fingers 114–118 each demodulate the same sample stream. The controller 122 (not shown) sends commands for demodulating finger A (114) to demodulate sample stream A. As a result, demodulating finger A (114) provides soft symbols from sample stream A at its soft symbol output. Likewise, the controller 122 (not shown) sends commands for demodulating finger B (116) to demodulate sample stream A and demodulating finger C (118) to demodulate sample stream A. As a result, demodulating finger B (116) provides soft symbols from sample stream A, and demodulating finger C (118) provides soft symbols from sample stream A at their respective soft symbol outputs. Alternately, only two, or more than three, demodulating fingers can be selected to demodulate sample stream A. As another alternative, the demodulating fingers 114–118 could all have been selected to demodulate sample steam B or C.

Figure 9:
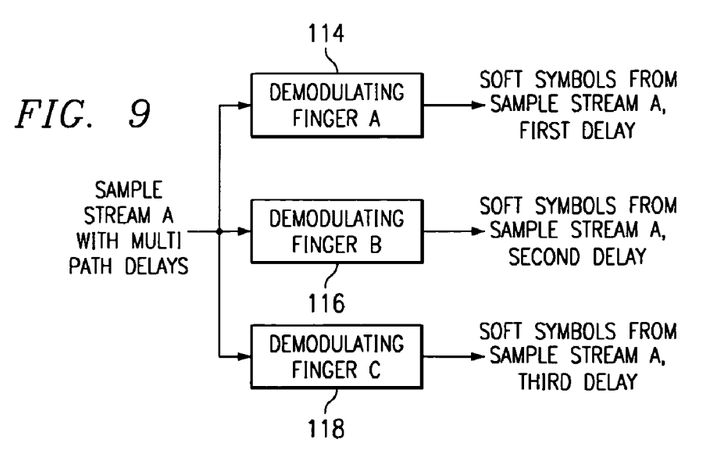
FIG. 9 illustrates an example where the demodulating fingers A through C can be used to improve the demodulation of sample streams that have suffered degradation due to multipath.

FIG. 9 illustrates an example where the demodulating fingers A (114) through C (118) can be used to improve the demodulation of sample streams that suffered degradation due to multipath. For example, carrier A (104) may be received with a plurality of multipath delays. These multipath delays are converted into sample stream A having a plurality of sample stream delays. Each of the sample stream delays can be assigned to a different demodulating finger for demodulation. For example, a first delay of sample stream A can be demodulated at demodulating finger A (114), a second delay at demodulating finger B (116), and a third delay at demodulating finger C (118). The controller (not shown) of the present invention can assign each delay to a different demodulating finger, and the present invention is only limited by the total number of demodulating fingers in the receiver.

Figure 10:
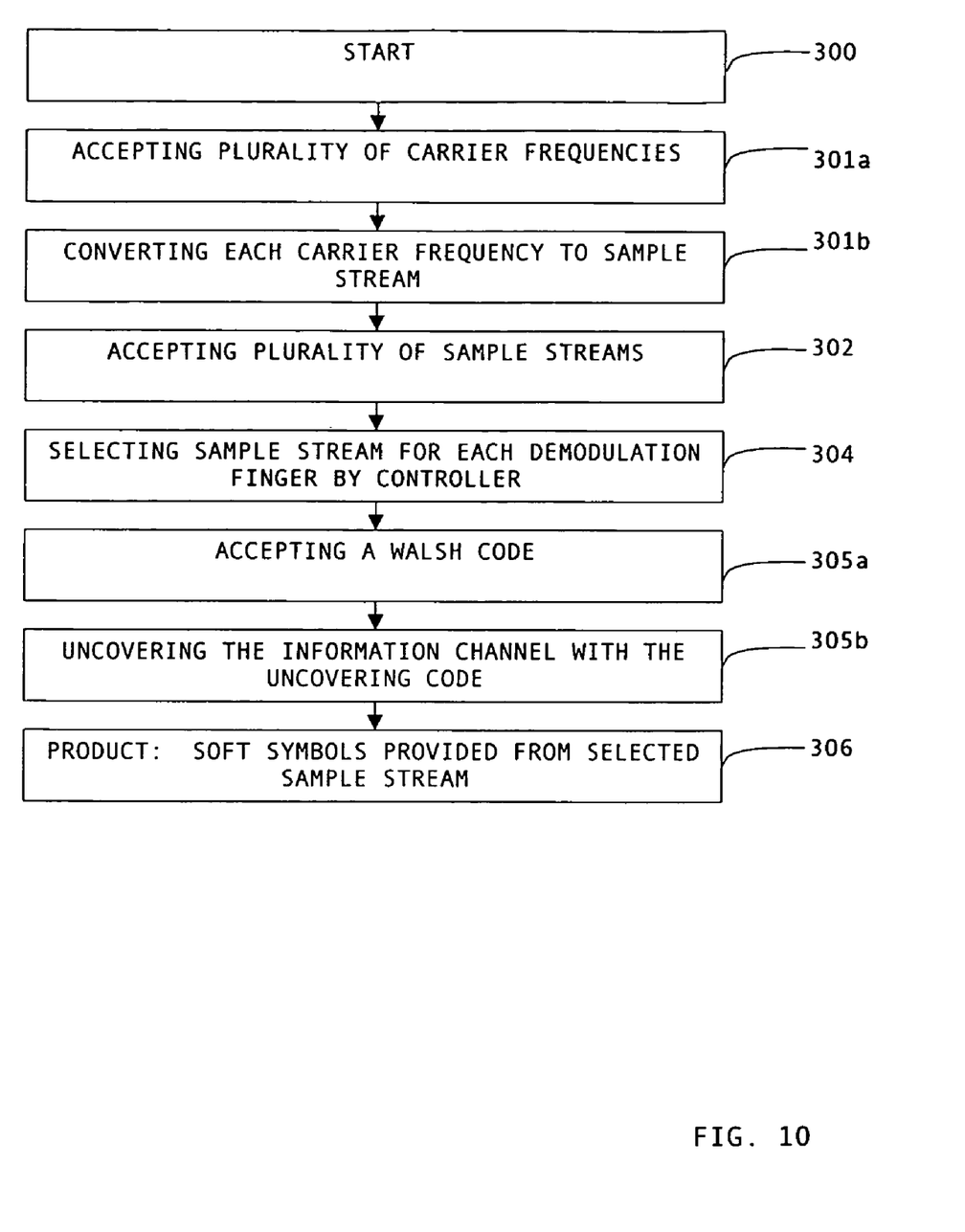
FIG. 10 is a flowchart illustrating the present invention method for a DSSS communications receiver to demodulate information channels in a plurality of sample streams.

FIG. 10 is a flowchart illustrating the present invention method for a DSSS communications receiver to demodulate information channels in a plurality of sample streams. Although the method is presented as a sequence of numbered steps for clarity, no order should be inferred from the numbering unless explicitly stated. Step 300 is the start. Step 302 accepts a plurality of sample streams. Step 304 selects a sample stream from among the plurality of sample streams. Step 306 is a product, where soft symbols are provided from the selected sample steam.

In some aspects of the invention, the accepting of the plurality of sample streams in Step 302 includes each sample stream having an information channel, and the providing soft symbols in Step 306 includes providing soft symbols from a demodulated information channel in the selected sample stream. The method includes Step 305a, which accepts a Walsh code. Then, Step 305b uncovers the information channel with the Walsh code. Typically, the accepting of the plurality of sample streams in Step 302 includes each sample stream having a plurality of information channels, and the providing the soft symbols in Step 306 includes providing soft symbols from a plurality of demodulated information channels in the selected sample stream.

In some aspects of the invention, the selecting of a sample stream in Step 304 includes selecting each sample stream from the plurality of sample streams, so that Step 306 provides soft symbols from each of the plurality of sample streams.

In some aspects of the invention, Step 300 starts with the inclusion of a demodulating finger. Then, the demodulating finger accepts the plurality of sample streams in Step 302. The demodulating finger accepts sample stream selection commands in Step 304, and provides the soft symbols from the selected sample stream in Step 306. In some aspects of the invention, a controller is included. Then, Step 304 includes the controller selecting the sample stream, and the demodulating finger accepting sample stream selection commands from the controller.

Typically, the receiver includes a plurality of demodulating fingers. Then, each demodulating finger accepts the plurality of sample streams in Step 302. The controller selects a sample stream for each demodulating finger in Step 304. Each demodulating finger accepts sample stream selection commands from the controller in Step 304, and provides the soft symbols from the selected sample stream in Step 306.

Typically, the method includes further steps. Step 301a accepts a plurality of carriers. Step 301b converts each carrier from the plurality of carriers into a plurality of sample streams. Then, the accepting of a plurality of sample streams in Step 302 includes accepting a sample stream from each carrier in the plurality of carriers.

As an example, Step 300 could start with the inclusion of a first, second and third demodulating finger. The receiving a plurality of carriers in Step 301a includes receiving a first, second, and third carrier. The converting each carrier from the plurality of carriers in Step 301b includes converting the first carrier to a first sample stream, the second carrier to a second sample stream, and a third carrier to a third sample stream. The first, second, and third demodulating fingers accept the first, second, and third sample streams in Step 302, and the controller selects the first sample stream for the first demodulating finger, the second sample stream for the second demodulating finger, and the third sample stream for the third demodulating finger in Step 304.

As another example, Step 300 may start with the inclusion of a first and second demodulating finger. The receiving a plurality of carriers in Step 301a includes receiving a first, second, and third carrier. The converting of each carrier from the plurality of carriers in Step 301b includes converting the first carrier to a first sample stream, the second carrier to a second sample stream, and a third carrier to a third sample stream. The first and second demodulating fingers accept the first, second, and third sample streams in Step 302, and the controller selects the first sample stream for the first demodulating finger and the first sample stream for the second demodulating finger in Step 304.

As yet another example, Step 300 could start with the inclusion of a first, second and third demodulating finger. The receiving a plurality of carriers in Step 301a includes receiving a first carrier with a plurality of multipath delays, including a first, second, and third delay. The converting each carrier from the plurality of carriers in Step 301b includes converting the first carrier with a plurality of delays into a first sample stream with a plurality of delays, including a first, second, and third delay. The first, second, and third demodulating fingers accept the first sample stream with the plurality of delays in Step 302, and the controller selects the first sample stream first delay for the first demodulating finger, the first sample stream second delay for the second demodulating finger, and the first sample stream third delay for the third demodulating finger in Step 304.

A receiver system and method have been presented above for the selection of a sample stream for demodulation, from among a plurality of sample streams. The invention has been described in the context of receiving a plurality of sample stream from a corresponding plurality of carriers, with the assumption that the carriers are transmitted from the same source. The invention is also applicable to the selection of a sample stream, however the sample streams are received. It is conceivable that the plurality of sample streams could include sample streams from different wireless sources or different antennae, to name but a few examples. The assumption has also been made in the above description of the invention that the invention is only applicable to forward link communications. However, the invention is also applicable to transmissions received at a base station from remote units. Other variations and embodiments of the invention will occur to those skilled in the art.

The invention claimed is:

1. In a direct sequence spread spectrum (DSSS) communications receiver, a system for demodulating information channels in a plurality of sample streams, the system comprising:
a controller having an output to select a sample stream; and
a plurality of demodulating fingers, each demodulating finger having sample stream inputs to accept the plurality of sample streams, a selection input connected to the controller output to accept sample stream selection commands, and each demodulating finger demodulating information channels to provide soft symbols from the selected sample stream at a soft symbol output;
wherein each demodulating finger includes a multiplexer having a plurality of inputs connected to the demodulating finger sample stream inputs to accept the plurality of sample streams, a select input connected to the demodulating finger selection input to accept the sample stream selection commands, and an output to provide the selected sample stream.

2. The system of claim 1 wherein each demodulating finger further includes:
a plurality of finger channels, wherein each finger channel includes a sample stream input coupled to the multiplexer output to accept the selected sample stream, a code input to accept an uncovering code, each finger channel demodulating an information channel in the selected sample stream in response to the accepted uncovering code to provide soft symbols at a soft symbol output connected to the demodulating finger soft symbol output.

3. The system of claim 2 further comprising:
a code generator having an output to provide uncovering codes; and
wherein each demodulating finger further includes a code input connected to the code generator output to accept uncovering codes; and
wherein the code input of each finger channel is connected to the demodulating finger code input to accept uncovering codes.

4. The system of claim 1 in which the plurality of sample streams are converted from a plurality of accepted carriers; and
wherein each demodulating finger accepts the plurality of sample streams converted from the plurality of carriers.

5. The system of claim 4 wherein the controller selects a sample stream for each of the demodulating fingers from the plurality of sample streams.

6. The system of claim 5 in which three sample streams are respectively converted from a first, second, and third carrier;
wherein the controller assigns a first sample stream, from the first carrier, to a first demodulating finger from the plurality of demodulating fingers;
wherein the controller assigns a second sample stream, from the second carrier, to a second demodulating finger from the plurality of demodulating fingers; and
wherein the controller assigns a third sample stream, from the third carrier, to a third demodulating finger from the plurality of demodulating fingers.

7. The system of claim 5 in which three sample streams are respectively converted from a first, second, and third carrier;
wherein the controller assigns a first sample stream, from the first carrier, to a first demodulating finger from the plurality of demodulating fingers; and
wherein the controller assigns the first sample stream, from the first carrier, to a second demodulating finger from the plurality of demodulating fingers.

8. The system of claim 7 wherein the controller assigns the first sample stream, from the first carrier, to a third demodulating finger from the plurality of demodulating fingers.

9. The system of claim 1 in which a first carrier is received with at least a first and second multipath delay, and in which the first carrier first and second multipath delays are converted into a first sample stream with at least a first and second delay;
wherein the controller assigns the first sample stream first delay to a first demodulating finger from the plurality of demodulating fingers; and
wherein the controller assigns the first sample stream second delay to a second demodulating finger from the plurality of demodulating fingers.

10. In a direct sequence spread spectrum (DSSS) communications receiver, a demodulating finger for demodulating information channels in a plurality of sample streams, the demodulating finger comprising:
sample stream inputs to accept the plurality of sample streams;
a selection input to accept sample stream selection commands;
a multiplexer having a first input connected to the demodulating finger sample stream inputs to accept the plurality of sample streams, a second input connected to the demodulating finger selection input to accept the sample stream selection commands, and an output to provide the selected sample stream; and a soft symbol output to provide soft symbols from demodulated information channels in a selected sample stream.

11. The demodulating finger of claim 10 further comprising:

a plurality of finger channels, wherein each finger channel includes a sample stream input coupled to the multiplexer output to accept the selected sample stream, a code input to accept an uncovering code, each finger channel demodulating an information channel in the selected sample stream in response to the accepted uncovering code to provide soft symbols at a soft symbol output connected to the demodulating finger soft symbol output.

12. The demodulating finger of claim 11 wherein each demodulating finger further includes:

a code input to accept a plurality of uncovering codes; and wherein the code input of each finger channel is connected to the demodulating finger code input to accept an uncovering code.

13. The demodulating finger of claim 10 in which the plurality of sample streams correspond to a plurality of converted carriers; and wherein the demodulating finger accepts the plurality of sample streams converted from the plurality of carriers.

14. The demodulating finger of claim 13 in which a first, second, and third sample stream are respectively converted from a first, second, and third carrier;

wherein the demodulating finger accepts the sample stream selection commands for the selection of a sample stream from the group including first, second, and third sample streams.

* * * * *